United States Patent [19]
Warren et al.

[11] 3,726,374
[45] Apr. 10, 1973

[54] CIRCULAR SEGMENTED FRICTION MEMBER FOR BRAKE OR CLUTCH

[75] Inventors: John H. Warren, Troy; Lowell D. Bok, Anno, both of Ohio

[73] Assignee: The B. F. Goodrich Company, New York, N.Y.

[22] Filed: June 2, 1971

[21] Appl. No.: 149,169

[52] U.S. Cl. .......................... 192/107 R, 188/218 XL
[51] Int. Cl. ............................................. F16d 11/00
[58] Field of Search ................... 192/107 R, 107 M, 192/113 A; 188/218 XL

[56] References Cited

UNITED STATES PATENTS

| | | | |
|---|---|---|---|
| 3,605,968 | 9/1971 | Ely | 192/107 R |
| 3,483,953 | 12/1969 | Bender | 188/218 XL |
| 2,728,421 | 12/1955 | Butler | 188/218 XL |
| 2,986,253 | 5/1961 | Brantingham | 192/113 A |

FOREIGN PATENTS OR APPLICATIONS

| | | | |
|---|---|---|---|
| 857,363 | 12/1910 | Great Britain | 192/107 |
| 960,074 | 6/1964 | Great Britain | 192/107 M |

*Primary Examiner*—Charles J. Myhre
*Assistant Examiner*—Randall Heald
*Attorney*—John D. Haney and W. A. Shira, Jr.

[57] ABSTRACT

A brake or clutch mechanism having an annular stator or rotor with concentric rings of heat absorbing material sandwiched between facing members connected by fasteners extending between the rings for holding the rings in spaced-apart position. The facing members are connected to a torque member at the inner or outer periphery which holds the next adjacent ring in place.

13 Claims, 6 Drawing Figures

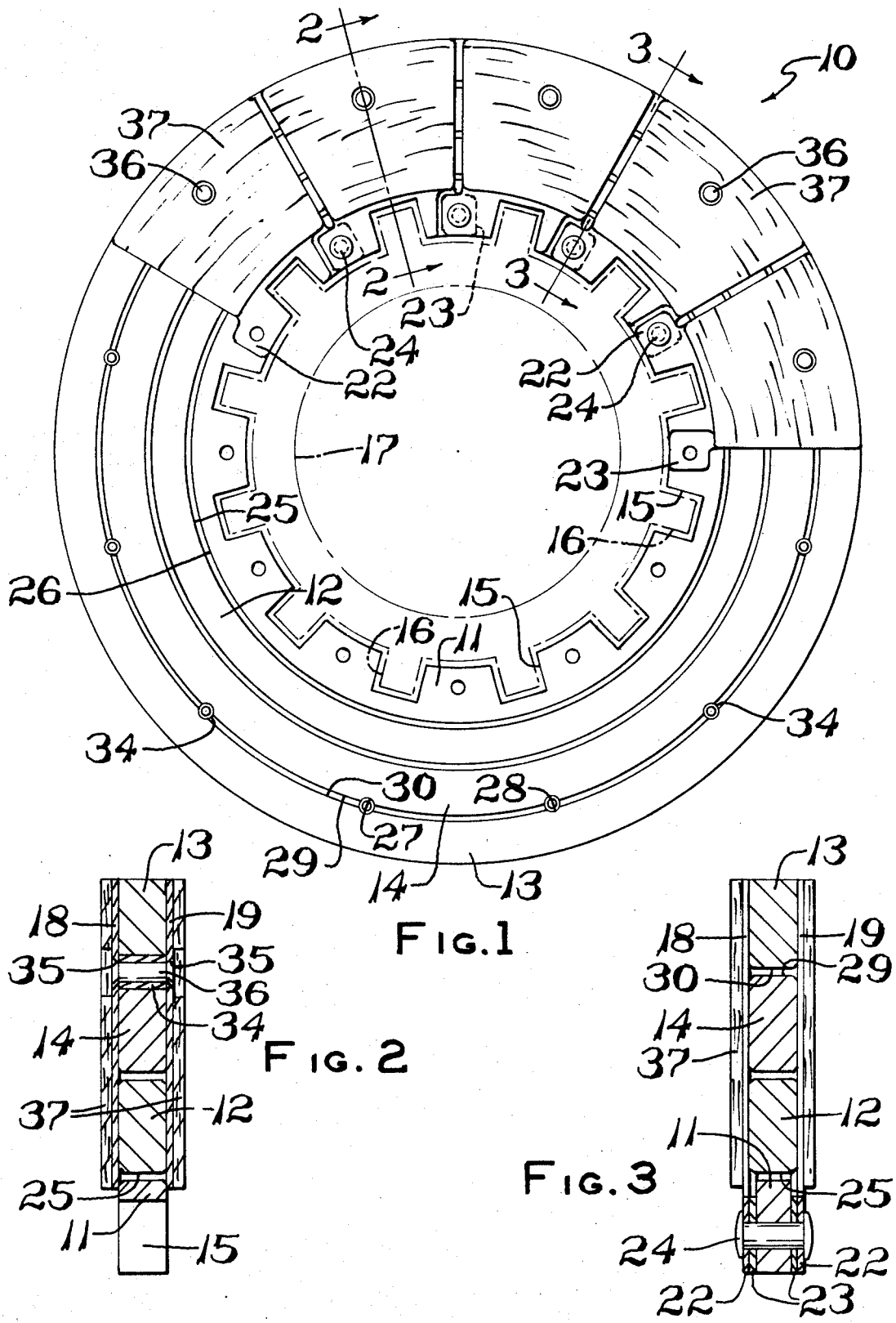

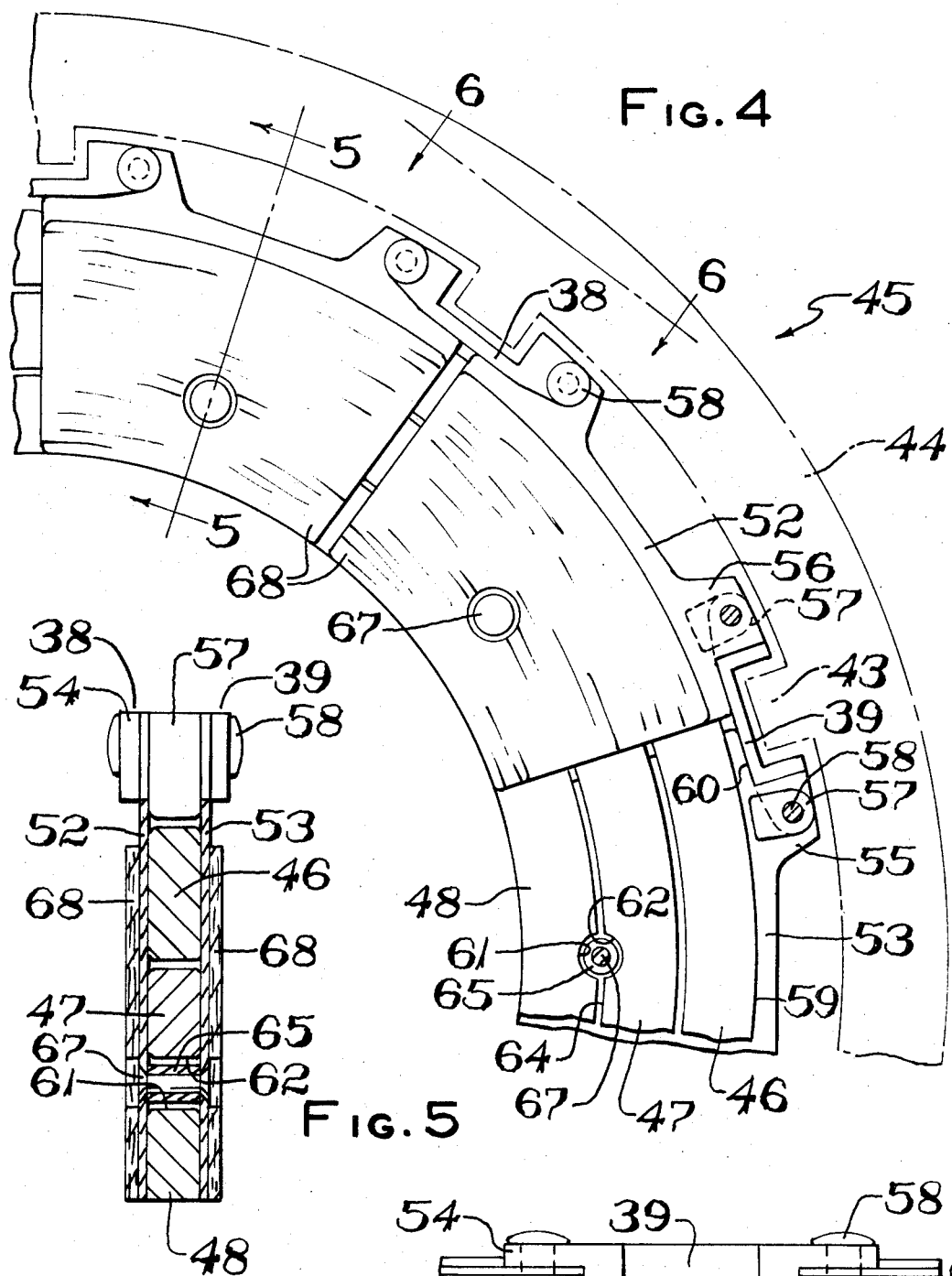
FIG. 4
FIG. 5
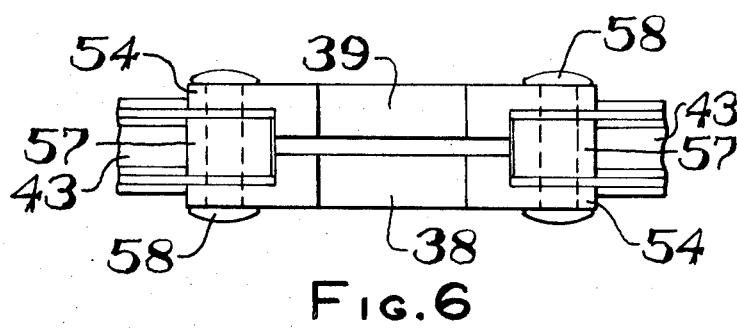
FIG. 6

CIRCULAR SEGMENTED FRICTION MEMBER FOR BRAKE OR CLUTCH

BACKGROUND OF THE INVENTION

This invention relates to disc type brakes or clutches and particularly to the annular friction disc members which engage other friction disc members during operation of the brake or clutch. These friction disc members are subjected to high stresses during operation and also must withstand exceedingly high temperatures because of the energy generated through the frictional engagement of the discs. The high heat generated in brakes such as those used, for example, on aircraft, cause the friction disc members to be heated quickly from a low temperature such as that found at high altitudes to the excessively high temperatures during operation of the brakes and accordingly the friction disc members must be designed to withstand thermal warpage which could cause cracking of the brake discs.

In friction disc members used heretofore, radially extending thermal slots have been cut in the discs to relieve these thermal stresses; however, this has been done at the expense of reduced structural strength of the disc. To compensate for the reduced strength, it has been necessary to add reinforcements of high strength material such as steel and this has reduced the space available for low density heat absorbing material such as beryllium.

Another problem with the friction disc members having annular members of heat sink material has been that when the annular members become worn in one area, a replacement for the whole member had to be made even though the wear was in a small area. This increased the cost of operation appreciably when high cost heat sink materials were used. In previous designs the members of heat sink material also had to be machined to close tolerances and the machining was of a nature which required considerable time and skill.

SUMMARY OF THE INVENTION

According to this invention, the heat sink members are in a segmental concentric relationship having rings which eliminate the need for the radially extending thermal slots and increase the structural strength of the disc. Replacement of individual segmental heat sink rings can be accomplished without requiring replacement of other parts of the heat sink structure. Furthermore, the cost of machining the heat sink members is at a minimum and close tolerances are not required. The facing members between which the heat sink rings are sandwiched are connected by fasteners which also provide for positioning the rings. Likewise, the connections between the torque members and the facing members also position the next adjacent heat sink rings in the friction disc member.

The accompanying drawings show a preferred form and a modification made in accordance with and embodying this invention and which are representative of how this invention may be practiced.

BRIEF DESCRIPTION OF THE DRAWINGS

In the drawings:

FIG. 1 is an axial elevational view of the friction disc assembly (shown in solid lines), certain parts being broken away with the friction disc member being illustrated in torque driving engagement with a related part which in this example may be a torque tube of a wheel supporting structure, the sides of the torque tube being represented by the chain-dotted lines;

FIG. 2 is a cross sectional view of the assembly taken along the plane of line 2—2 of FIG. 1;

FIG. 3 is another cross sectional view of the assembly taken along the plane of line 3—3 of FIG. 1;

FIG. 4 is a fragmentary axial elevational view of a modification of the invention with certain parts being broken away and with the annular friction disc member being illustrated in torque driving engagement with a related part which in this example may be a rotatable wheel, the sides of which are represented by the chain-dotted lines;

FIG. 5 is a cross sectional view taken along the plane of line 5—5 of FIG. 4;

FIG. 6 is a fragmentary side elevation taken along the plane of line 6—6 of FIG. 4.

DETAILED DESCRIPTION

Referring to FIG. 1, friction disc assembly 10 has a torque ring 11 of steel or other strong wear-resistant material surrounded by a radially inner ring 12, a radially outer ring 13 and a radially intermediate ring 14 in a concentric relation. The inner ring 12, outer ring 13 and intermediate ring 14 may be of a heat sink material having a high heat absorbing capacity such as beryllium.

The torque ring 11 has axially extending grooves 15 at circumferentially spaced-apart positions around the inner periphery for receiving the splines 16 of a torque tube 17 of a wheel supporting structure shown in chain-dotted lines.

As shown more clearly in FIGS. 2 and 3, facing members 18 and 19 which may have an arcuate sector shape are fastened to the torque ring 11 and extend radially outward on either side of the inner ring 12, outer ring 13 and intermediate ring 14. The facing members 18 and 19 have overlapping ears 22 and 23, respectfully, with holes in alignment with holes in the torque ring 11 through which rivets 24 may be inserted and riveted in position.

The inner ring 12 has an inner diameter 25 which is approximately equal to but slightly larger than the outer diameter 26 of torque ring 11 which holds the inner ring in the desired radial position within the disc assembly. Axially extending grooves 27 and 28 are provided at circumferentially opposing spaced-apart positions along the outer diameter 29 of the intermediate ring 14 and the inner diameter 30 of the outer ring 13, respectfully, for receiving spacers such as sleeves 34 extending between the facing members 18 and 19. Holes 35 in the facing members 18 and 19 are in alignment with the passages through the sleeves 34. Fasteners such as rivets 36 may be disposed in the sleeves 34 and through holes 35 where they are riveted in place for positioning the outer ring 13 and intermediate ring 14 in the desired location within the disc assembly. These fasteners also connect the facing members 18 and 19 providing a unitary structure having the necessary structural properties for withstanding the torque stresses.

Friction lining materials 37 may be adhered to the facing members 18 and 19 and may be of the type described and set forth in U. S. Pat. No. 2,966,737 of R. E. Spokes et al. The friction lining material is located radially outward of the torque ring 11 and rivets 24 which connect ears 22 and 23 of the facing members 18 and 19. Accordingly, the connections in this area are radially inward of the "heat-swept" area where the thermal distortion is at a minimum. In the "heat-swept" area the concentric inner heat sink ring 12, outer heat sink ring 13 and intermediate heat sink ring 14 are held in spaced-apart positions by the facing members 18 and 19 and by the sleeves 34 so that thermal distortions may be accommodated without distorting the disc assembly and causing undue wear or damage to the disc assembly during the braking operation.

A modification of the invention is shown in FIG. 4 in which double torque links 38 and 39 are in driving engagement with mating, interfitting driving pieces such as lugs 43 on an associated brake or clutch member such as wheel rim 44 represented in chain-dotted lines. The torque links 38 and 39 are at the outer periphery of a disc assembly 45 which has a radially outer heat sink ring 46, an intermediate heat sink ring 47 and an inner heat sink ring 48 in concentric relationship within the torque links 38 and 39.

Arcuate sector-shaped segmental facing members 52 and 53 extend radially inward from the torque links 38 and 39 on opposite faces of the concentric heat sink rings 46, 47 and 48. Each of the torque links 38 and 39 is U-shaped with a connecting flange 54 extending circumferentially and overlapping radially extending lugs 55 and 56 of the facing members 52 and 53. The flanges 54 are rabbeted to receive the lugs 55 and 56 and an interposed spacing member 57 all of which have aligned holes through which rivets 58 may be inserted and riveted in place.

The outer heat sink ring 46 has an outer diameter 59 which is slightly less than the diameter of the surface made up of the inner diameter 60 of the spacing members 57 and torque links 38 and 39 to hold the outer ring in the desired radial position during operation. Axially extending grooves 61 and 62 at the outer diameter of the innermost ring 48 and at the inner diameter 64 of the intermediate ring 47 are spaced circumferentially of the assembly to receive sleeves 65 extending between the facing members 52 and 53. Holes 66 in the facing members are provided in alignment with passages through the sleeves 65 for fasteners such as rivets 67 extending through the facing members and sleeves to fasten the facing members together and also hold the intermediate heat sink ring 47 and inner heat sink ring 48 in position.

Friction lining material 68 is adhered to the outer faces of the facing members 52 and 53 and may be of the type described and set forth in U. S. Pat. No. 2,966,737 of R. E. Spokes et al. The friction lining material 68 is located radially inward of the torque links 38 and 39 so that the so-called "heat-swept" area is spaced from the torque connections. Furthermore, the concentric inner heat sink rings 46, 47 and 48 are located in the area of high heat generation and high temperature differentials and with the spaced-apart positioning of these rings, allowance is made for thermal distortion without interfering with the efficient operation of the assembly. The heat sink rings 46, 47 and 48 may be of a material having a high heat absorbing capacity such as beryllium and, as can be seen, are easily machined and do not require close tolerances.

Although the heat sink rings are shown as continuous rings in the preferred construction, the heat sink rings 46 and 47 may be segmental and each made up of separate pieces having a length at least as great as the distance between the rivets 67 since the segmental rings will be held in place and provide the heat absorbing capacity desired. The inner ring 48 may also be segmented providing the inner edges of facing members 52 and 53 are extended and turned over the inner ring to retain it between the facing members. This is also true of the heat sink rings 12, 13 and 14 of the construction shown in FIG. 1, with the only difference being that the outer edges of facing members 18 and 19 would be turned over the outer peripheral edge of the outer ring 13 if it were segmented.

We claim:

1. An annular friction member for a brake or clutch comprising concentric rings of heat absorbing material, spacers disposed between said rings at circumferentially spaced-apart positions providing circumferential spaces between said rings for holding said rings in radially spaced-apart positions to provide for expansion and contraction, axial grooves in opposing faces of said rings at said circumferentially spaced-apart positions for receiving said spacers and holding said rings against relative movement circumferentially thereof, said rings being sandwiched between radially extending facing members on opposite sides of said rings, said spacers having passages in alignment with openings in said facing members through which fasteners extend for connecting said facing members on opposite sides of said rings, an annular torque ring at the inner periphery and said facing members being connected to said spacers and having overlapping portions fastened to said torque ring for transmitting torque.

2. An annular friction member according to claim 1 wherein the radially innermost of said rings fits around said torque ring for limiting radial movement and the other of said rings are held in radially spaced-apart positions by said facing members and said spacers.

3. An annular friction member for a brake or clutch comprising concentric rings of heat absorbing material, spacers disposed between said rings at circumferentially spaced-apart positions providing circumferential spaces between said rings for holding said rings in radially spaced-apart positions to provide for expansion and contraction, axial grooves in opposing faces of said rings at said circumferentially spaced-apart positions for receiving said spacers and holding said rings against relative movement circumferentially thereof, said rings being sandwiched between radially extending facing members on opposite sides of said rings, said spacers having passages in alignment with openings in said facing members through which fasteners extend for connecting said facing members on opposite sides of said rings, torque links connecting adjacent facing members at the outer periphery and additional fasteners for connecting said facing members on opposite sides of said rings at said outer periphery, said facing members being connected to said spacers and to said torque links for transmitting torque.

4. An annular friction member according to claim 3 wherein said facing members are separated by sleeves with said additional fasteners extending through said sleeves, said links and said facing members at the outer periphery, and the radially outermost of said rings nesting within said sleeves and said links for limited radial movement while the other of said rings are held in radially spaced-apart positions by said by said facing members and said spacers.

5. An annular friction member for a brake or clutch comprising concentric rings of heat absorbing material, spacers disposed between said rings at circumferentially spaced-apart positions providing circumferential spaces between said rings for holding said rings in radially spaced-apart positions to provide for expansion and contraction, said rings being sandwiched between radially extending facing members on opposite sides of said rings, an annular torque ring at the inner periphery and said facing members being connected to said spacers and being fastened to said torque ring for transmitting torque.

6. An annular friction member according to claim 5 wherein at least one of said concentric rings of heat absorbing material is continuous throughout the entire 360-degree extent of the ring.

7. An annular friction member according to claim 5 wherein at least one of said concentric rings is made up of more than one piece and the resulting segments are disposed in a ring.

8. An annular friction member for a brake or clutch comprising concentric rings of heat absorbing material, spacers disposed between said rings at circumferentially space-apart positions providing circumferential spaces between said rings for holding said rings in radially spaced-apart positions to provide for expansion and contraction, said rings being sandwiched between radially extending facing members on opposite sides of said rings, 8 torque transmitting member connecting adjacent facing members at the outer periphery and said facing members being connected to said spacers and to said torque transmitting member.

9. An annular friction member according to claim 8 wherein said spacers have passages in alignment with openings in said facing members through which fasteners extend for connecting said facing members on opposite sides of said rings and additional fasteners for connecting said facing members being disposed on opposite sides of said rings at said outer periphery.

10. An annular friction member according to claim 8 wherein at least one of said concentric rings of heat absorbing material is continuous throughout the entire 360° extent of the ring.

11. An annular friction member according to claim 8 wherein at least one of said concentric rings is made up of more than one piece and the resulting segments are disposed in a ring.

12. An annular friction member for a brake or clutch comprising separate concentric rings of heat absorbing material, spacers disposed between said rings at circumferentially spaced-apart positions providing circumferential spaces between said rings, axial grooves in opposing faces of said rings at said circumferentially spaced-apart positions for receiving said spacers and holding said rings against relative movement circumferentially thereof, said friction member having configured means at either the inner or outer periphery for transmitting torque, and said configured means and said spacers being connected by a torque transmitting radial member extending radially of said friction member.

13. An annular friction member according to claim 12 wherein one of said rings next adjacent said configured means is held in position by said configured means and the other of said rings are held in radially spaced-apart positions by said radial member and said spacers.

* * * * *